United States Patent [19]

Svoronos et al.

[11] Patent Number: 5,802,161
[45] Date of Patent: Sep. 1, 1998

[54] METHOD AND SYSTEM FOR OPTIMIZED SCHEDULING

[75] Inventors: Alexander Svoronos; Daniel N. Duncan, both of Austin, Tex.

[73] Assignee: Austin Logistics Inc., Austin, Tex.

[21] Appl. No.: 620,601

[22] Filed: Mar. 22, 1996

[51] Int. Cl.$^6$ .............................. H04M 3/42; H04M 3/00
[52] U.S. Cl. .................... 379/216; 379/265; 379/309; 395/207; 395/208; 395/209; 395/602
[58] Field of Search .................... 379/216, 265, 379/266, 309, 355, 356; 395/200.09, 207, 208, 209, 602

[56] References Cited

U.S. PATENT DOCUMENTS

| | | | |
|---|---|---|---|
| 5,436,965 | 7/1995 | Grossman et al. | 379/266 |
| 5,592,543 | 1/1997 | Smith et al. | 379/265 |
| 5,594,790 | 1/1997 | Curreri et al. | 379/265 |
| 5,621,790 | 4/1997 | Grossman et al. | 379/265 X |

*Primary Examiner*—Harry S. Hong
*Attorney, Agent, or Firm*—Shaffer & Culbertson; Russell D. Culbertson

[57] ABSTRACT

A method of optimizing the scheduling of tasks may be used to schedule telephone contact attempts through an automated dialing system (20). The method includes receiving an account data file comprising account information for a plurality of accounts to be processed over a processing period. This processing period is divided into a plurality of contact attempt periods. The method also includes producing for each of the plurality of accounts an action result probability for each contact attempt period. The method also includes producing or determining a priority value for each of the accounts, determining a quantity of contact resources available over the processing period, and determining resource costs for each contact attempt. These quantities or values, along with the action result probability, represent parameters over which the scheduling may be optimized. Once the parameters are determined the method includes producing a contact attempt value for each account and each contact period. The contact attempt value comprises a numerical value representing the relative desirability of attempting to contact the respective account during the respective contact period considering the account's priority value, probability of right party contact, quantity of contact resources available, and the costs of making the contact attempt. After the contact attempt values are assigned to each account and each attempt period, the method includes making contact attempts within each contact attempt period in order of descending contact attempt value. Finally, the method of the invention includes collecting contact attempt history data.

20 Claims, 4 Drawing Sheets

METHOD AND SYSTEM FOR OPTIMIZED SCHEDULING

BACKGROUND OF THE INVENTION

This invention relates to the scheduling of resources to perform a series of tasks. Although the invention may be applied to many situations, it has particular application in optimizing the scheduling of telephone contact attempts for collections or marketing purposes. The invention includes a method for optimizing the scheduling of resources and a computer system for performing optimized scheduling.

Where a series of tasks are to be performed with relatively limited resources, the tasks must be scheduled to accommodate the resources available. For example, bank card issuers commonly attempt to contact delinquent accounts by telephone in order to inform the account holder of the delinquency and reach an agreement on payment. However, the number of delinquent accounts may extend into the many thousands, well beyond the number of collectors or operators available in a given period. The collection calls in this situation are therefore scheduled in some manner with each collector handling one call after another over the course of the day.

Another example of resource scheduling arises in telemarketing where operators contact potential customers directly by telephone to make a sales solicitation. Since the targeted market may include thousands of potential customers, the telemarketing operators cannot reach all potential customers at the same time, but must make calls according to some schedule to reach the desired potential customers.

Beyond direct telephone contacts for collections or telemarketing purposes, there are many other situations in which resources must be scheduled to perform a number of tasks relatively larger than the amount of resources available for performing the tasks at any one time. Specific collection actions may, for example, be scheduled for different accounts according to the probability of success and the resources each is expected to utilize. In this case, the resources may include available collector time and the monetary budget for contacting accounts by mail.

At least in the telephone contact arena, technological advances have effectively increased resources available by allowing an operator to contact more persons in a given time period. For example, automated dialing systems have greatly increased the efficiency of telephone contact operations. Automated dialing systems include telephone dialing and switching hardware controlled or operated by a computer which accesses a database having a series of accounts or prospects to be contacted. The computer which controls the automated dialing hardware causes the dialer to dial numbers associated with different accounts or prospects according to some order. After dialing, if the computer detects that a person has answered the call, the automated dialing system quickly switches the call to an available operator. Also, the computer transfers pertinent information to a terminal operated by the assigned operator to enable the operator to effectively communicate with the person reached. During the course of the call or immediately after the call is terminated, the operator records the result of the contact at the operator's terminal and this information may be added to a historical database containing a contact history for each account or prospect. This rapid machine dialing through the automated dialing system greatly increased the pace of telephone contact operations and effectively increased the resources available for making contact by making the operators more productive.

More advanced automated dialing systems known as "predictive dialers" were developed to further increase operator productivity. Predictive dialers are automated dialers which include some mechanism for directing calls at a rate designed to keep each operator as busy as possible with minimum down time and without causing a contacted person to wait on hold for the next available operators.

Although these technological advances have allowed collectors or operator to be more productive, the number of collectors or operators available for handling telephone contacts at a given time is still much smaller than the total number of calls to be made. Calls must still be handled or scheduled in some order according to collector or operator availability. This ordering or scheduling of calls was initially random or arbitrary and was not optimized for any purpose.

U.S. Pat. No. 5,436,965 was directed to a schedule optimizing system for outbound telephone call campaigns. This system first sorted a set of accounts for teleprocessing according to relative priorities and then associated with each account a probability of contacting an individual associated with the account. The prioritized accounts with probability of contact data added were then separated into optimized campaigns that created a chronological schedule of contact attempts. The contact attempts for each account were scheduled at the time each targeted individual was most likely to answer the telephone within the constraint of dialer resources available to make the call at a particular time.

Although the system disclosed in U.S. Pat. No. 5,436,965 provided some scheduling optimization for telephone contact operations, the disclosed system addressed scheduling only in terms of contact probability. However, limiting the schedule to highest contact probability results in a suboptimum scheduling in terms of other factors that may be important in the particular telephone contact campaign. For example, assume there are two accounts, account A and account B, that are to be contacted in a bank card collections situation. Account A may be substantially delinquent and therefore have a relatively high contact priority but a relatively low contact probability that is constant over a given time period. Account B may be only slightly delinquent and therefore have a much lower priority, and may have a relatively high probability of contact for a given time of day. Given that scenario and given limited teleprocessing or operator availability, it may be more important or optimal to attempt to contact both accounts at times of the day that do not correspond to the respective highest contact probability. After all, the object of the telephone collections operation is not simply to make the maximum number of contacts, but to maximize collections.

SUMMARY OF THE INVENTION

It is an object of the invention to overcome the above-described problems and others associated with prior scheduling systems. In particular, it is an object of the invention to provide an apparatus and method of optimizing the allocation of resources to a series of tasks by scheduling the tasks to be performed over a period of time. The optimized allocation or scheduling according to the invention may be applied in a number of situations, including telephone marketing or telephone collections operations as well as direct or personal contact operations.

In order to accomplish these objects, the optimization method and system according to the invention schedules or orders tasks not only in terms of highest contact probability but also in terms of relative priority, quantity of resources available for accomplishing the tasks, and the cost of an attempt at accomplishing each task. Therefore, according to the invention, scheduling is optimized in light of a total cost benefit analysis, the cost of making an attempt at a certain time and the benefit of making the attempt at that time. The invention facilitates optimizing the objectives of performing the series of tasks rather than optimizing simply one component that affects the overall objectives.

For convenience, the invention will be discussed below primarily in terms of an outbound telephone call system for collection purposes. However, the invention is not limited to the telephone collections application. The invention may be used to optimize outbound telephone calls for telemarketing rather than collections. Also, the invention may be employed to optimize tasks other than telephone contact attempts. For example, the invention may be applied to optimize personal collections or sales. Those skilled in the art will readily appreciate that the invention may be applied to optimize scheduling in substantially any situation calling for the scheduling of a series of tasks which substantially outnumber the resources available for performing the tasks at any one time.

In the telephone collections area, the method of the invention first includes receiving a number of accounts to be contacted over a processing period. The processing period is preferably a single day, and is further divided into a series of contact attempt periods preferably corresponding to the hours in the day in which collection calls can be made. In addition to receiving the accounts, the invention includes producing or defining parameters over which the scheduling will be optimized. One parameter is an action result probability, which includes a right party contact probability in the telephone collections application. Another parameter may be referred to as a priority value, usually defined in terms of some characteristic or combination of characteristics of an account which make contact more or less important relative to other accounts. In any case, the priority value parameter defines a relative contact priority between accounts. Additional parameters over which the scheduling will be optimized are the quantity of collector or dialer resources available over the processing period, and the cost of each contact attempt. In the telephone collections arena, the cost of a telephone contact attempt is defined in terms of the operator or collector time required for handling the call.

After selecting the number of accounts to be processed in the day and defining the parameters over which the schedule will be optimized, the method includes the step of producing a relative contact attempt value for each attempt period and each account. This relative contact attempt value is preferably derived from the solution to a linear program maximizing the product of the priority value and the probability of right party contact at a particular time for a particular account, summed for each account and each contact period. There are three families of constraints to the linear program. The first family of constraints is that the proportion of a particular account called at a particular time is greater than or equal to zero. The second family of constraints is that the summed proportions of each account called at a particular time over the contact periods is less than or equal to one. The third and final family of constraints is that the total time necessary for making the contact attempts in a particular time period is less than or equal to the total collector time available in that particular time period.

After producing a contact attempt value for each account and each contact attempt period, the method includes making contact attempts within each attempt period in order of descending contact attempt value. In the telephone collections operation, this step of making contact attempts is preferably performed through an automated dialing system. The automated dialing system sorts accounts within each attempt period according to the contact attempt value and causes the dialer to dial the various accounts according to that sorting.

Finally, the preferred form of the invention for telephone collection operations includes, for each account, recording a contact attempt history. The contact attempt history is used to update parameters for optimization in future processing periods.

The step of producing the action result probability includes estimating probabilities for three potential outcomes of the contact attempt. The three potential outcomes are right party contact, wrong party contact, and no connect, the latter representing all contingencies other than right and wrong party contacts. The right party contact probability, wrong party contact probability, and no connect probability sum to one. These contact probabilities may be produced by any suitable statistical modeling technique and preferably a step-wise polytomous logistic regression technique using contact attempt history data from previous processing periods and using account history data.

The contact attempt or resource cost values are defined for each potential outcome of a contact attempt and also may be produced using the contact attempt history data. However, the contact attempt cost values may be produced by any suitable method and may, in fact, be fixed values provided by the user of the optimized scheduling method. The costs in the bank card collection application of the invention preferably are estimates of handle times for contact attempts resulting in a right party contact, a wrong party contact, and a no connect.

The priority value and quantification of contact attempt resources are both defined by the user of the optimized scheduling method. The quantity of contact attempt resources available is simply the number of operator hours available over the course of the processing period. The priority value may be developed by substantially any method to rank relative priority of contact among the various accounts to be processed.

The preferred form of the invention also includes producing a forecast for each processing period. The forecast in the telephone collections example preferably comprises expected values for the number of right party contacts, number of dialing attempts, and number of objectives met over the course of a processing period. The forecast may be compared with the actual results from the contact attempt historical data collected during the forecasted processing period to determine the effectiveness of the priority value definition.

After determining the effectiveness of the priority value and other parameters used to produce contact attempt values, the forecast may be used to make collector staffing decisions concerning the number of collectors used over future processing periods. The method may be used to produce forecast data using several different quantities for available collector hours. The forecasted results may indicate that the collector hours may be increased or reduced in certain contact attempt periods in order to optimize collection performance.

In addition to a method of optimizing scheduling, the invention also includes a computer system for scheduling tasks. The computer system includes an account storage device or account storage means to store data relating to the accounts to be processed and parameters used in the optimization process. The system also includes a download connection or download means for enabling the account storage device to receive an account data file containing information on the desired accounts to be processed. A historical data storage device or storage means is included in the system as well as historical data upload means for enabling contact attempt history data to be transferred to the contact attempt data storage device.

The computer system further includes a user input or parameter input means enabling a user to input some of the optimization parameters used in the process. The user input is used to enter priority values or functions for defining priority values for each account, the quantity of available resources, and contact attempt costs where such costs are not produced using historical data.

A first processor or first processor means within the computer system functions to produce the contact result probabilities and also the contact attempt values for each account and each contact attempt period over the processing period. The contact attempt values are stored in the account storage device along with account information in an assignment data file. The assignment data file is used to produce a modified download file which is transferred to a processor which sorts the accounts into descending contact attempt values within each contact period. This processor may comprise a second processor or processing means associated with a separate computer used to control an automated dialing system. Associated with the second processor is a historical data storage device or means for collecting contact attempt history data derived from the contact attempts made under the control of the second processor. The historical data upload means effectively connects the first and second processors for enabling the collected contact attempt history data to be transferred to the historical data storage device.

These and other objects, advantages, and features of the invention will be apparent from the following description of the preferred embodiments, considered along with the accompanying drawings.

DESCRIPTION OF THE PREFERRED EMBODIMENTS

Figure 1:
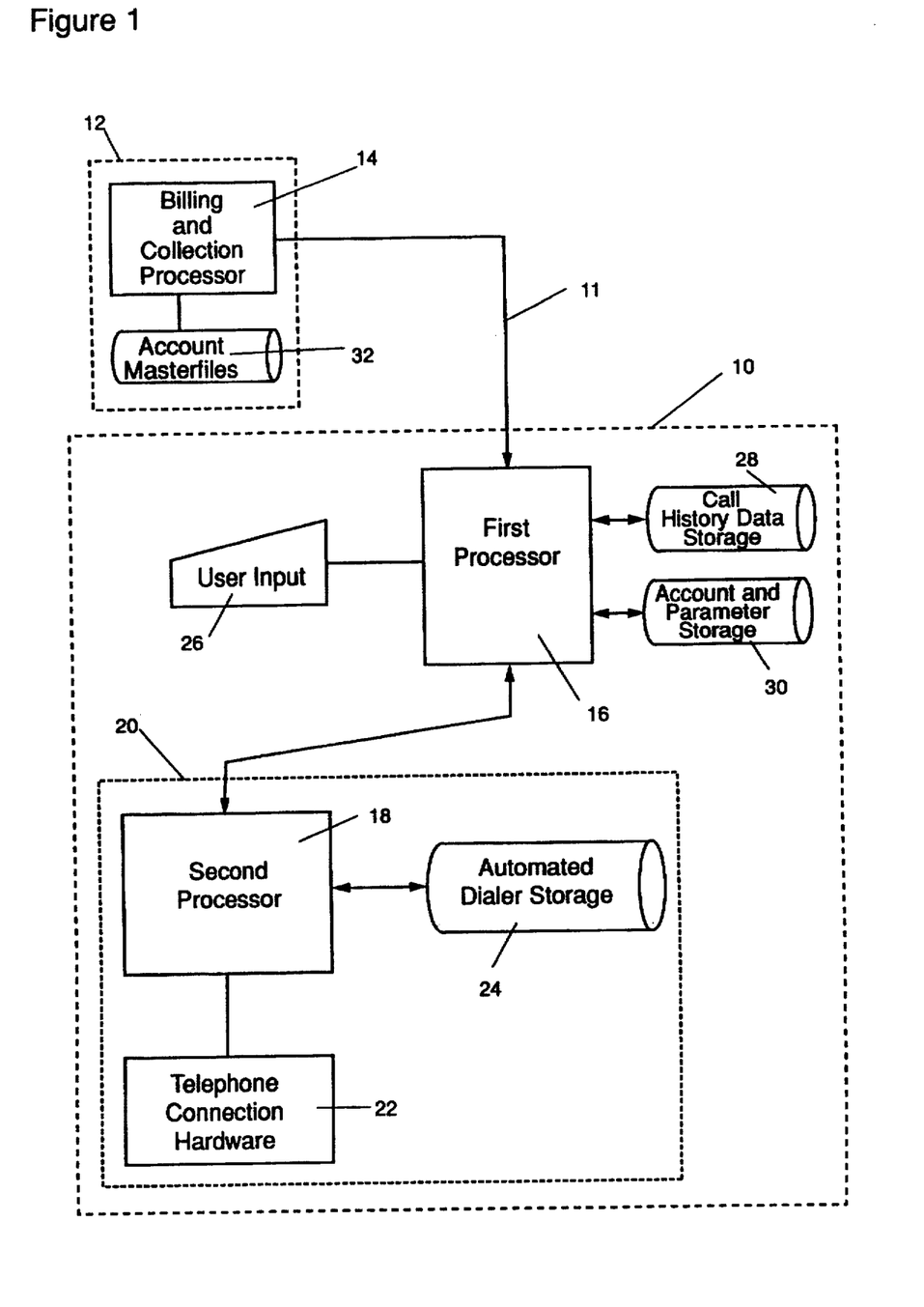
FIG. 1 is a schematic diagram of a computer embodying the principles of the invention for scheduling telephone contact attempts.

A computer system 10 according to the invention is shown schematically in FIG. 1. The computer system 10 is connected through a download connection 11 to receive data from a separate billing and collections system, shown in FIG. 1 as a separate computer system 12 having a processor 14. In the form of the invention illustrated in FIG. 1, the system 10 includes two separate processors, a contact probability and scheduling processor or first processor means 16, and a separate automated dialer processor or second processor means 18. The second processor 18 is a component of an automated dialing system 20 which also includes telephone connecting and switching hardware 22 and a data storage device 24. Preferably, the second processor 18 comprises a separate work station or microcomputer and the automated dialer storage is simply the mass storage device associated with the work station. An example of an automated dialer system 20 suitable for use in the system 10 is the MOSAIX SERIES 5000 system produced by Digital Systems International.

The first processor 16 has associated with it a user input or parameter input means 26 and also mass storage devices 28 and 30. The preferred first processor 16 comprises a work station or microcomputer and the user input 26 and storage devices 28 and 30 are simply the input and storage devices associated with the work station. Although separate data storage devices 28 and 30 are shown associated with the first processor 16, those skilled in the art will readily appreciate that a single storage device may be used rather than two. Separate data storage devices 28 and 30 are shown in FIG. 1 to reflect the fact that essentially two types of data are accessed by the first processor 16, historical data and optimization parameters or values, as will be discussed below.

Although FIG. 1 illustrates one preferred implementation of the computer system 10 according to the invention, those skilled in the art will readily appreciate that the system may be implemented in a number of different hardware configurations. For example, although the system 10 is shown as having two separate processors 16 and 18, a single processor may be utilized to perform the functions performed by the two separate processors shown in the figure. In this alternative single processor form of the invention, the process tasks described below for the first and second processors 16 and 18 are simply performed by a single processor. Therefore a single processor implementation is to be considered an equivalent to the two processor system shown in FIG. 1. Furthermore, the invention may be implemented in a distributed computing environment in which numerous processors are networked together and functions may be performed by several different processors within the distributed system, perhaps in parallel fashion. This distributed system alternative is also to be considered an equivalent to the two processor system shown in FIG. 1.

Also, although the various storage devices shown in FIG. 1 may be associated with a particular processor, and are preferably hard drives associated with the respective work station, the storage devices may be distributed over a network with the first and second processors, 16 and 18 respectively, having access to the storage devices over the network. Similarly, the account master file storage 32 shown in FIG. 1 need not necessarily be associated directly with the billing and collection processor 14, but may be located in a network accessible by the billing and collection processor. FIG. 1 simply reflects the common implementation for telephone collections operations. Telephone collections operations normally use a billing and collections system implemented on a mainframe computer, and an automated dialer system controlled by a separate work station. In this common situation, the first processor 16 according to the invention is interposed between the mainframe billing and collections system 12 and the automated dialer system 20 as shown in FIG. 1.

The account master files contained in the account master file storage device 32 include all account data pertinent to billing and collections. For example, the account master files may include an account ID, names on the account, telephone numbers, a billing address, account balance, last payment, days delinquent or delinquency history, and purchase history. The system 10 according to the invention is adapted to receive from the account master files an account data file containing data on a plurality of accounts to be processed through the system 10 over a certain processing period, a single day for example. This processing comprises allocating dialer and collector resources to make contact attempts for the accounts according to a schedule optimized to meet desired objectives. Thus, the system 10 operates to intercept the master file download that would otherwise go to an automated dialer. The first processor 16 of system 10 preferably puts the received accounts in condition to be sorted and scheduled by the second processor 18 to optimize the chances of achieving the desired user-defined objectives. The automated dialer system 20 within the system 10 then directs the contact attempts or calls to accounts through the telephone connection hardware 22, and the associated automated dialer storage 24 collects historical information regarding each contact attempt for use by the first processor 16.

Figure 2:
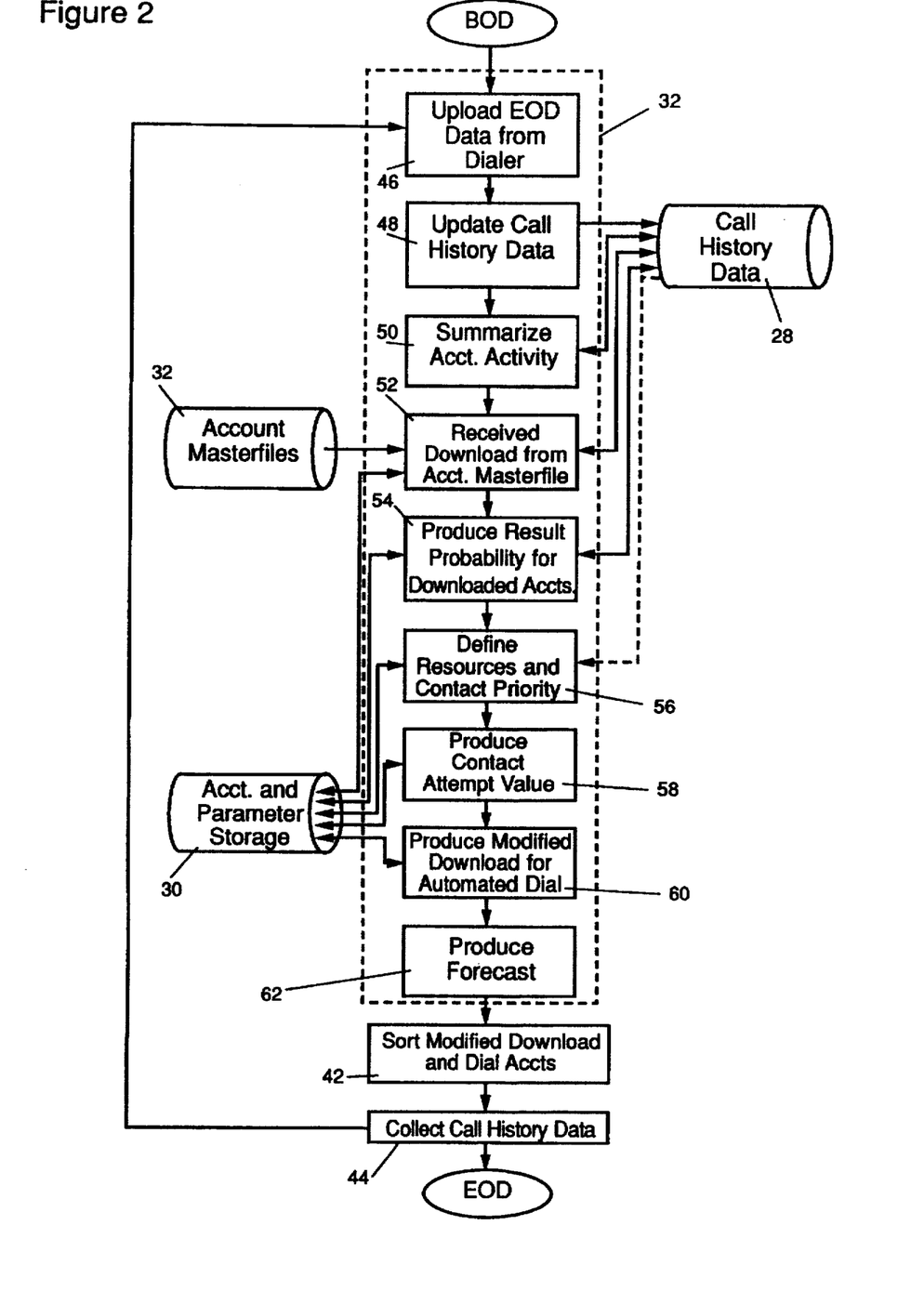
FIG. 2 is a system flow chart for the telephone contact attempt system shown in FIG. 1.

FIG. 2 shows an overall system flow chart for the telephone collection system 10 shown in FIG. 1. Dashed rectangle 33 in FIG. 2 shows the functions performed by the first processor 16. The final two steps 42 and 44 shown at the bottom of FIG. 2 are performed by the second processor 18 shown in FIG. 1.

Referring to both FIGS. 1 and 2 at the beginning of each day, or BOD shown in FIG. 2, the first processor 16 receives an upload of contact attempt history data from the previous day's operation of the automated dialer system 20. The uploaded contact attempt history data comprises raw call attempt history data which the first processor 16 uses to update a call history data database within historical data storage device 28 associated with the first processor. This call history database updating step is shown at reference numeral 48 in FIG. 2. The call history database maintained within the storage device 28 includes for each account, account identifying information and information relating to the outcome of past contact attempts for the respective account.

In addition to receiving the raw end-of-day data from the automated dialer or second processor 18, the first processor 16 also summarizes the contact attempt history data at step 50 to put the information in a form more usable by the system operator. The summarization of data may include the number of contact attempts, contacts, and promises made over a preceding period or periods. The system operator defines the manner in which data is summarized at step 50 through the user input 26 associated with the first processor 16. The summarized contact history data is stored in a separate summary file within the call history data storage device 28 associated with the first processor 16.

At step 52 in the process shown in FIG. 2, the first processor 16 receives the account data file preferably as a flat file downloaded from the master billing and collection system 12 through the data transfer connection or download means 11 and stores the account data file in the account storage device 30. After storing the account data file, the processor 16 operates to make any desired or necessary data format changes. As discussed above, the downloaded account data file includes information on plurality of accounts to be contacted within the processing period.

After receiving the account data file download from the account master file at step 52, the first processor 16 produces an action result probability for each account and for each contact period as will be discussed in detail below with reference to FIG. 4 and as shown generally in FIG. 2 as step 54. The action result probability for each account and for each contact period is an important factor in optimizing the scheduling of contact attempts between the various accounts. However, action result probability is just one factor considered according to the invention.

Other important factors considered in the scheduling optimization process of the invention include the resources available for making contact attempts at a given time and a relative contact priority value of attempting to contact a particular account. Among these factors or parameters, the resources available may simply be entered at step 56 into the storage device 30 through the user input device 26 associated with the first processor 16. The contact priority value for each account may be based upon a single characteristic such as the dollar amount an account is delinquent or may be derived from a more complex function using a number of different elements that vary from account to account. An example of a more complex function for determining priority value could be the amount delinquent, number of days delinquent, and number of delinquencies in the past year multiplied together and divided by the amount paid by the account over the previous year, or even the result of another modelling effort. In any event, the priority value for each account is determined using the function or value entered by the user at step 56 through the user input 26 associated with the first processor 16.

In addition to relative contact priority values for each account to be processed and the resources available for making contact attempts, the system and method of the invention schedules contact attempts based also upon the cost of making a contact attempt. In the telephone collections example of the invention, the cost of making a call attempt may be defined in terms of collector time. Since the time required in making a contact attempt via telephone is dependent upon the result of the attempt, the resource cost is defined in terms of multiple values. For example, where the action result probability includes probabilities of contact divided into right party contact probability and all other potential outcomes, two values of resource costs are required, that is the time cost of making a right party contact and the time cost of all other potential outcomes. In the preferred form of the invention the probabilities are defined as right party contact probability, wrong party contact probability, and all other potential outcomes or the no connect probability. In this case the resource costs will be defined by three different values, one value representing the time required for a right party contact, another value for the time required for a wrong party contact, and a third value for all other results. These cost values may be defined by the user or entered through the input device 26 at step 56, or may be averaged or otherwise derived from call attempt history data.

With the accounts to be processed defined by the account data file download and the other scheduling parameters determined or calculated, the method of the invention includes the step 58 of producing a contact attempt value for each account and for each contact period within the processing period. The contact attempt value represents a relative desirability of making a contact attempt for a particular account in a particular contact attempt period. This contact attempt value for each contact attempt period is then associated with its respective account to produce an assignment data file from which is developed a modified download for the automated dialer system 20 at step 60. The modified download may comprise a file that includes account information for a plurality of accounts, and for each account a function including contact attempt value for each contact attempt period. Alternatively, the modified download may comprise a file containing account information for a plurality of accounts and information on the optimal contact attempt period to call for each account, and preferably, the contact attempt value associated with the optimal contact attempt period for each account. Although the modified download may be formatted in a number of different ways, the contact attempt value associated with each account for each contact attempt period allows the accounts to be sorted or indexed into descending order of contact attempt value for each contact period. This descending order of contact attempt value is preferably produced with the second processor 18 at step 42 shown in FIG. 2, and represents the schedule of contact attempts for each contact period. Of course where the modified download includes only account information and the optimum contact attempt period to call for each account, the second processor simply groups the accounts for calls during their respective optimal contact attempt period, and the sorting is thus accomplished using both the first processor 16 and second processor 18.

After sorting, the second processor 18 causes the dialer hardware 22 to call the accounts according to the descending contact attempt value schedule. For each contact attempt or call the second processor 18 also collects contact attempt history data relating to the contact attempt. This contact attempt history data may include the time the attempt is made, the result of the attempt, the duration of the call, and payment amount promised or other indicators such as "hardship" for example. The contact attempt history information is collected at step 44 in FIG. 2 and stored in the automated dialer storage device 24 associated with the second processor 18. The information is later uploaded or transferred to the first processor and associated storage 28 at the beginning of the following day or other processing period as shown in FIG. 2.

The step 58 in FIG. 2 of producing a contact attempt value for each account and each contact period preferably involves maximizing over all accounts and all contact periods the relative account priority value, probability of right party contact, and proportion of a particular account called at a particular time. The basic problem can be expressed in terms of the linear program:

$$(LP1) \max_{x_{it}} \sum_i \sum_t c_{it} p_{it} x_{it}$$

with the constraints $\forall i, t: \quad x_{it} \geq 0$ $\forall i:$
$$\sum_t x_{it} \leq 1$$

$\forall t:$
$$\sum_i (tm(q_{it}) + tc(p_{it}) + tn(r_{it})) x_{it} \leq h_t$$

where  $i$ = account 1 ... N
$t$ = contact period ... T
$x_{it}$ = proportion of account i called at time t
$p_{it}$ = right-party contact probability at time t for account i
$q_{it}$ = wrong-party contact probability at time t for account i
$r_{it}$ = no connect probability at time t for account i
  ($r_{it} = 1 - q_{it} - p_{it}$)
$tc$ = average time of contact attempt that resulted in right-party contact
$tm$ = average time of contact attempt that resulted in wrong-party contact
$tn$ = average time of contact attempt that resulted in no connect
$h_t$ = total collector time available at time t
$c_{it}$ = priority value for account i at time t.

The nature of the solution to this linear program guarantees that a solution exists that is essentially integer, either 0 or 1. The linear program can be solved with a general solution process, for example simplex, an interior point method, or preferably using a Lagrangian function.

As shown at step 62 in FIG. 2, the preferred form of the invention includes producing forecasted results. The forecasted results include a value for the expected number of contacts and a value for expected objectives met for each contact period and the total. The expected number of contacts are calculated by summing the probabilities of right party contact for scheduled calls, that is calls that will be scheduled according to the modified download produced in step 60. The value for expected objectives met is calculated by summing the product of the probability of right party contact and the priority value for scheduled calls.

Figure 3:
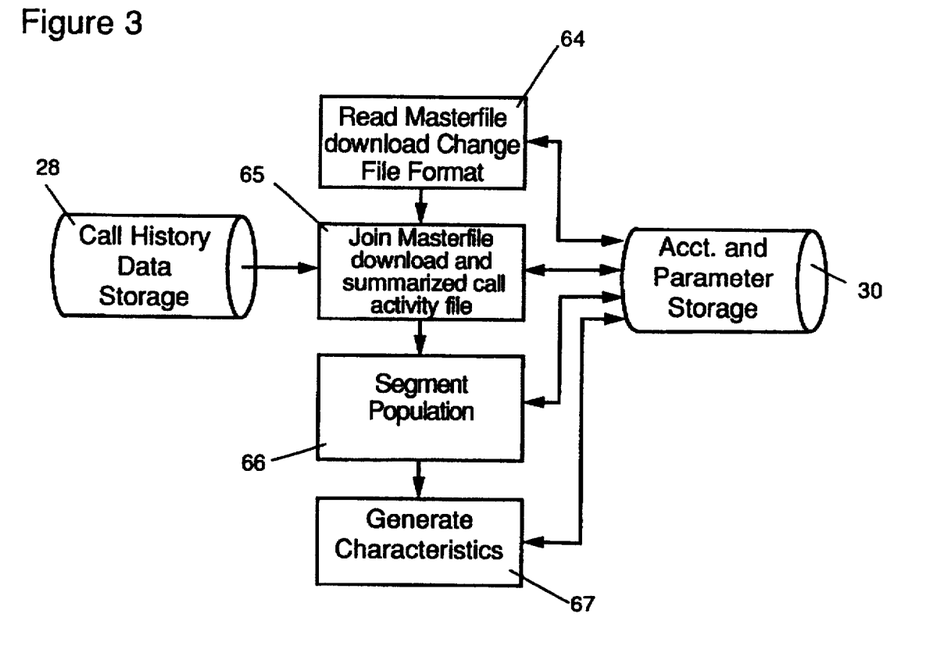
FIG. 3 is a flow chart showing the steps for receiving account data file download.

FIG. 3 shows the preferred process steps included in receiving the master file download shown at step 52 in FIG. 2. Immediately upon reading the master file download, the data is preferably reformatted at step 64 to put all information in a standardized form for further processing. Dates are represented as a number of days since a certain date, times are represented as seconds since midnight, and numerical representations are represented as integers or real numbers. These format standardization changes simply facilitate the further manipulations required by the invention.

Once the format changes are accomplished, the preferred form of the invention includes at step 65 in FIG. 3, merging the reformatted download data file with information from the summarized account activity file created at step 50 shown in FIG. 2. This file merger places summarized call history data in a single file with the reformatted download data to facilitate the calculation of action result probability at step 54 in FIG. 2.

Referring still to FIG. 3, the preferred form of the invention also gives the user the option of segmenting the download population at step 66. Thus, the user may segment or group accounts which it wishes to collect differently. For example, new or marginally delinquent accounts may be separated from seriously delinquent accounts which are best handled by the most experienced collectors. At step 67, the user may also generate account characteristics such as days since last payment to be added to the merged file. These characteristics may be used later in producing the contact priority value as shown at step 56 in FIG. 2 or the right-party contact, wrong-party contact and no connect probability estimates shown at step 72 FIG. 4.

Figure 4:
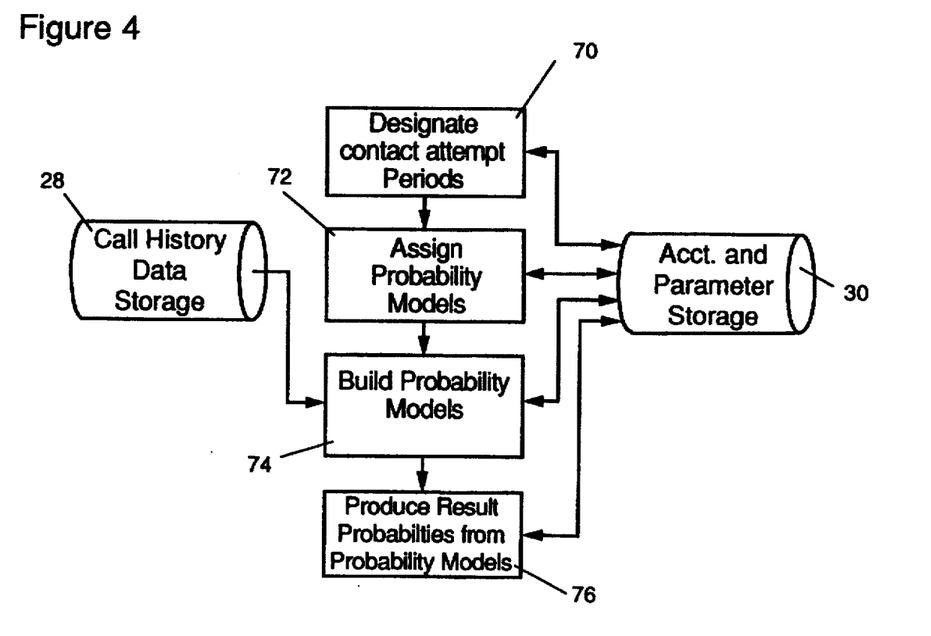
FIG. 4 is a flow chart showing the steps for producing contact probabilities.

FIG. 4 shows the preferred procedure for producing the action result probability according to the invention. The first step 70 in the process is to designate contact attempt periods within the overall processing period. In collections and marketing operations, the processing period may be a single day and the contact attempt periods may be defined as the sixteen hours in the day available for making telephone contact attempts. However, those skilled in the art will readily appreciate that the processing period need not be any particular length of time and the contact attempt periods may be substantially any convenient subdivision of the overall processing period. Also, for applications of the invention outside the telephone collection area, periods of a larger processing period may not be used at all. Rather than time being the variant and the contact attempt periods representing permissible variation of the time variant, optimization may be with respect to some other variant. For example, in an application of the invention to sales, the different products may be defined rather than contact periods. In this sale example the product represents the variant and the different products the permissible variation. Furthermore, in the sales example, the outcomes or action results could be defined as acceptance, rejection of offer, and "other." In the telephone collections application the action result probabilities are preferably defined as right party contact probability, wrong party contact probability, and no connect or all other results probability.

After defining the contact attempt periods, the accounts to be processed must be grouped or assigned to probability models or scorecards at step 72 in FIG. 4. Each model or scorecard comprises a set of probability score values. The user defines conditions which are used in assigning accounts to a particular scorecard. Different scorecards are used for subsets of accounts which behave differently. That is, different attributes enter the scorecards or models with varying weights.

Once the accounts are assigned to probability models, the models may be built or rebuilt at step 74 as necessary. The user defines the time intervals at which the models are rebuilt using the additional historical data collected from the last time the models were rebuilt. The rebuild interval may range from infinity, that is, never rebuild, to preferably not less than one or two months for the telephone collections application.

The probability models or scorecards may be developed by any suitable method but are preferably developed by applying a step-wise polytomous logistic regression technique. According to the preferred process, three distinct categories of outcome are identified, right party contacts (group G1), wrong party contacts (group G2), and no connect or "other" (group G3). A random sample containing all three categories is drawn from the call history database. Given a random sample $X=(x_1, x_2,$ through $x_n)$ where $x_1$ is an account in the sample (an m-dimensional vector whose components are the candidate characteristics), the likelihood function for a pair of m-dimensional vectors a and b is defined as follows:

$$L(a,b) = \prod_{i \in G1} \exp(a^T x_i)/(1+\exp(a^T x_i)+\exp(b^T x_i))x$$
$$= \prod_{i \in G2} \exp(b^T x_i)/(1+\exp(a^T x_i)+\exp(b^T x_i))x$$
$$= \prod_{i \in G3} 1/(1+\exp(a^T x_i)+\exp(b^T x_i))$$

"a" is the right party contact score, and "b" is the wrong party contact score.

The modelling process involves a series of steps in which characteristics are added to the models. At each step of the modelling process the adjusted chi-squared statistics for all of the variables for either of the two possible scores not in the model are computed and examined. If the largest of these statistics is significant at a defined level, the variable with this largest adjusted chi-squared statistic is entered into the model. Once a variable is entered into a model it is never removed from the model. This stepwise process of entering variables into the models is continued until none of the remaining variables meet the defined significance test, in the preferred case 99%. After the models or scorecards are constructed, the intercepts are adjusted to reflect the true proportions of the three categories, rather than those represented in the sample.

Once the probability models or scorecards are rebuilt or updated, model parameters are produced in terms of a series of characteristics associated with a weighting factor or score. The probability values are then produced at step 76 in FIG. 4 during the master file download by matching characteristics from the downloaded accounts to the model parameters and then converting the resultant model value to a probability between zero and one.

Although contact probabilities may be defined as a right party contact probability and a non-right party contact probability, the preferred form of the invention defines three probabilities for three potential contact attempt results. Those preferred probabilities comprise right party contact probability, wrong party contact probability, and no connect probability, the latter representing the probability of all results other than right or wrong party contact.

Figure 5:
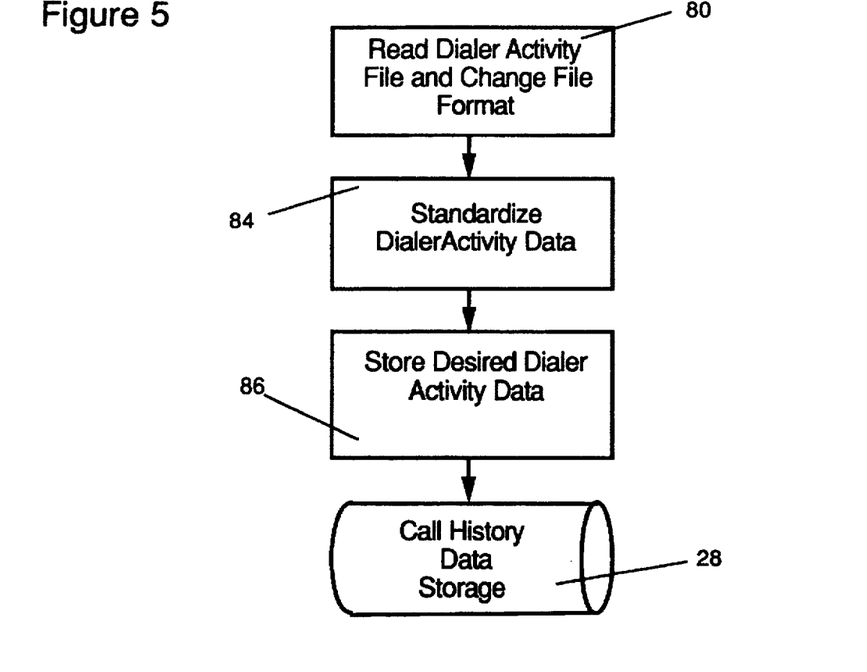
FIG. 5 is a flow chart showing the steps for receiving the contact attempt history data upload.

FIG. 5 shows the preferred steps of receiving or uploading the end of day contact attempt history data from the previous day's automated dialer files and updating the call attempt history database contained in the historical data storage device 28 associated with the first processor 16. The first step 80 comprises reading the dialer activity file and changing the file format as required to produce standardized data similar to the format changes in the master file download at step 64 in FIG. 3. The reformatting step produces standardized dates and times, converting to local time where the dialer is in another time zone. The dialer activity data is then standardized at step 84 to simplify future use or manipulation of the data. For example, the dialer activity data may be grouped into categories corresponding to the possible call outcomes. At step 86 the user then identifies the data to store permanently and stores the identified data to the call history database within a storage device 28. The user determines what data to keep and how long to use it.

Figure 6:
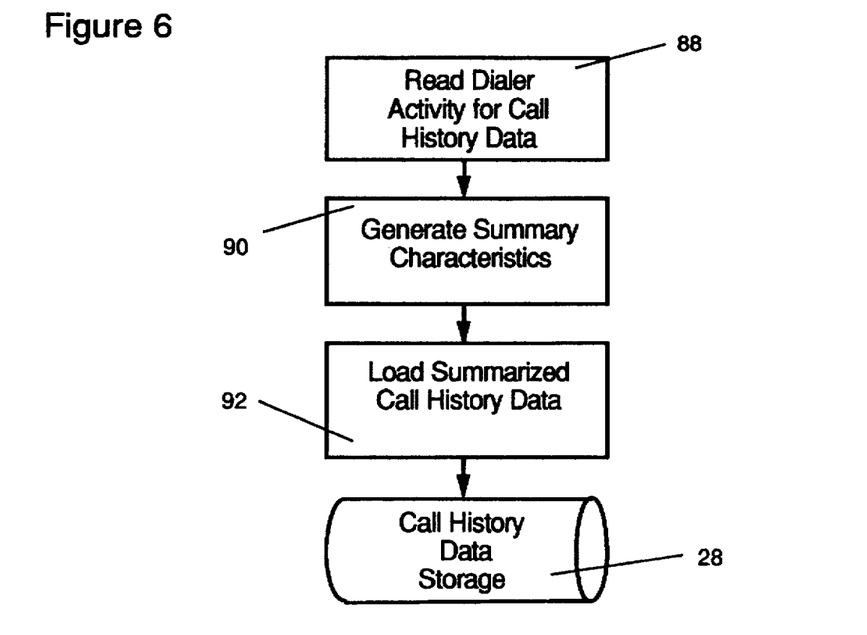
FIG. 6 is a flow chart showing the steps for summarizing the contact attempt history data.

Referring now to FIG. 6, the raw data collected at the dialer processor 18 is preferably summarized to put the data in a form more useful in the overall process shown in FIG. 2. The summarization process begins with reading dialer activity from the call history data storage at step 88 in FIG. 6. The data has already been reformatted and standardized as discussed in connection with FIG. 5. The retrieved data is then used to generate summary characteristics at 90 such as the number of calls made within a certain period. The user controls how the data is summarized. The summarized data is then stored in a database at step 92 for later use.

The above described preferred embodiments are intended to illustrate the principles of the invention, but not to limit the scope of the invention. Various other embodiments and modifications to these preferred embodiments may be made by those skilled in the art without departing from the scope of the following claims.

We claim:

1. A method of optimizing the allocation of resources to perform a plurality of task attempts in light of a variant which comprises a plurality of permissible variations, the method comprising the steps of:
   (a) computing an action result probability for each task attempt and each permissible variation of the variant;
   (b) producing a priority value for each task attempt;
   (c) determining a quantity of resources available within a time period for accomplishing the plurality of task attempts;
   (d) determining resource costs associated with each task attempt;
   (e) for each task attempt, producing a task attempt value, each task attempt value comprising a numerical value representing a relative desirability of performing the task attempt for the respective permissible variation considering the priority value for each task attempt, the probability of positive result for each task attempt and each permissible variation, the quantity of resources available for making the task attempts, and the resource costs associated with each task attempt; and (f) performing the task attempts within each permissible variation in order of descending task attempt value.

2. The method of claim 1 wherein the step of producing a task attempt value for each task attempt and each permissible variation of the variant comprises:

(a) solving the linear program $$\max_{x_{ij}} \sum_i \sum_j c_{ij} p_{ij} x_{ij}$$

with constraints $$x_{ij} \geq 0$$

$$\sum_j x_{ij} \leq 1$$

$$\sum_i \sum_j a_{ij}^k x_{ij} \leq b^k$$

to produce a solved value $x_{ij}$ for each task attempt and each permissible variation of the variant;

| where | i | = | task attempt 1 ... N |
|---|---|---|---|
| | j | = | permissible variation 1 ... J |
| | k | = | resource 1 ... K |
| | $x_{ij}$ | = | proportion of task attempt i performed with permissible variant j |
| | $p_{ij}$ | = | probability of success when performing task attempt i with permissible variant j |
| | $a_{ij}^k$ | = | amount of resource k used when performing task attempt i with permissible variant j |
| | $c_{ij}$ | = | priority value of performing task attempt i with permissible variant j |
| | $b^k$ | = | available amount of resource k |

(b) associating the solved value $x_{ij}$ with its respective task attempt and permissible variation of the variant.

3. A method of optimizing the scheduling of telephone contact attempts through an automated dialing system, the method comprising the steps of:

(a) receiving an account data file comprising account information for a plurality of accounts to be processed over a processing period, the processing period being divided into a plurality of contact attempt periods;

(b) for each of the plurality of accounts, producing an action result probability for each contact period;

(c) producing a priority value for each of the plurality of accounts; (d) determining a quantity of contact resources available over the processing period;

(e) determining resource costs for each contact attempt;

(f) for each account, producing a contact attempt value for each contact period, each contact attempt value comprising a numerical value representing a relative desirability of attempting to contact the respective account during the respective contact period considering the priority value for each account, the action result probability for each account, the quantity of contact resources available over the processing period, and the resource costs for each contact attempt;

(g) within each contact attempt period, making contact attempts for the plurality of accounts in order of descending contact attempt value; and (h) for each account, collecting contact attempt history data.

4. The method of claim 3 further including the step of:

(a) producing for each contact attempt period an expected right party contact value representing a number of expected right party contacts for the respective contact attempt period.

5. The method of claim 3 further including the step of:

(a) producing for each contact attempt period an expected right party contact value, an expected contact attempt quantity, and an expected objective met value.

6. The method of claim 3 wherein the step of producing an action result probability comprises:

(a) for each contact period, creating a set of probability score values for at least one user defined population using a polytomous logistic regression method based upon the account history for a representative sample for the plurality of accounts; and (b) for each set of probability score values, applying the respective set of probability score values to each account matching the user defined population for the respective probability score values.

7. The method of claim 6 wherein the step of creating a set of probability score values for at least one user defined population is performed at user determined intervals.

8. The method of claim 3 wherein the step of producing an action result probability comprises producing for each account and each contact attempt period a right party contact probability, a wrong party contact probability, and a no connect probability.

9. The method of claim 8 wherein the resource costs for each contact attempt include a cost of right party contact, a cost of wrong party contact, and a cost of no connect.

10. The method of claim 9 wherein the step of producing a contact attempt value for each account and each contact attempt period comprises:

(a) solving the linear program $$\max_{x_{it}} \sum_i \sum_t c_{it} p_{it} x_{it}$$

with constraints $$x_{it} \geq 0$$

$$\sum_t x_{it} \leq 1$$

-continued $$\sum_i (tm(q_{it}) + tc(p_{it}) + tn(r_{it}))x_{it} \leq h_t$$

to produce a solved value $x_{it}$ for each account and each contact period;

| where | | | |
|---|---|---|---|
| | i | = | account 1 ... N |
| | t | = | contact period 1 ... T |
| | $x_{it}$ | = | proportion of account i called at time t |
| | $p_{it}$ | = | right-party contact probability at time t for account i |
| | $q_{it}$ | = | wrong-party contact probability at time t for account i |
| | $r_{it}$ | = | no connect probability at time t for account i ($r_{it} = 1 - q_{it} - p_{it}$) |
| | tc | = | average time of contact attempt that resulted in right-party contact |
| | tm | = | average time of contact attempt that resulted in wrong-party contact |
| | tn | = | average time of contact attempt that resulted in no connect |
| | $h_t$ | = | total collector time available at time t |
| | $c_{it}$ | = | priority value for account i at time t, |

(b) associating the solved value $x_{it}$ with its respective account and contact attempt period.

11. The method of claim 3 further comprising the step of sorting the plurality of accounts into descending order of contact attempt value with the automated dialer system.

12. A computer system for optimizing the scheduling of telephone contact attempts over a processing period which is divided into a plurality of contact attempt periods, the computer system comprising:

(a) account storage means for storing:
an account data file comprising account information for a plurality of accounts to be processed over the processing period,
a priority value for each account,
a quantity of contact resources available over the processing period,
resource cost values associated with each contact attempt,
a plurality of sets of probability score values, and
an assignment data file comprising account information for the plurality of accounts and for each account a contact attempt value for each contact period;

(b) master file download means for enabling the account storage means to receive the account data file;

(c) historical data storage means for storing contact attempt history data for each of the plurality of accounts;

(d) parameter input means responsive to operator commands for enabling an operator to input priority data, and the quantity of contact resources available over the processing period;

(e) first processing means coupled to the account storage means and historical data storage means for
producing for each account an action result probability for each contact period, each action result probability being produced using one of the sets of probability score values; and
producing the contact attempt value for each account and each contact period, the contact attempt value comprising a numerical value representing a relative desirability of attempting to contact the respective account during the respective contact attempt period considering the priority value for each account, the action result probability for each account, the quantity of contact resources available over the processing period, and the resource cost for each contact attempt;

(f) modified download output means for transferring to an automated dialer system a modified download data file comprising account information for each account and contact attempt value information for each account and each contact attempt period, the contact attempt value information enabling the plurality of accounts to be sorted in descending order of contact attempt value for each contact attempt period; and (g) second processor means associated with the automated dialer system for scheduling contact attempts for each of the plurality of accounts, the contact attempts being scheduled within each contact attempt period in order of descending contact attempt value, and collecting contact attempt history data to be transferred to the historical data storage means through historical data upload means.

13. The computer system of claim 12 wherein the resource cost values include a cost of right party contact, a cost of wrong party contact, and a cost of no connect.

14. The computer system of claim 13 wherein:

(a) The action result probability comprises a right party contact probability, a wrong party contact probability, and a no connect probability.

15. The computer system of claim 14 wherein the first processor means produces each contact attempt value by:

(a) solving the linear program $$\max_{x_{it}} \sum_i \sum_t c_{it} p_{it} x_{it}$$

with constraints $$x_{it} \geq 0$$

$$\sum_t x_{it} \leq 1$$

$$\sum_i (tm(q_{it}) + tc(p_{it}) + tn(r_{it}))x_{it} \leq h_t$$

to produce a solved value $x_{it}$ for each account and each contact period;

| | | |
|---|---|---|
| where i | = | account 1 ... N |
| t | = | contact period 1 ... T |
| $x_{it}$ | = | proportion of account i called at time t |
| $p_{it}$ | = | right-party contact probability at time t for account i |
| $q_{it}$ | = | wrong-party contact probability at time t for account i |
| $r_{it}$ | = | no connect probability at time t for account i ($r_{it} = 1 - q_{it} - p_{it}$) |
| tc | = | average time of contact attempt that resulted in right-party contact |
| tm | = | average time of contact attempt that resulted in wrong-party contact |
| tn | = | average time of contact attempt that resulted in no connect |
| $h_t$ | = | total collector time available at time t |
| $c_{it}$ | = | priority value for account i at time $t$ |

(b) associating the solved value $x_{it}$ with its respective account and contact attempt period.

16. The computer system of claim 12 wherein:
(a) the first processor means is also for producing forecast data including an expected right party contact value, an expected contact attempt quantity, and an expected objective met value; and
(b) the account storage means is also for storing the expected right party contact value, the expected contact attempt quantity, and the expected objective met value.

17. The computer system of claim 12 wherein the first processor means is also for producing the resource cost value using the contact attempt history data.

18. The computer system of claim 12 wherein:
(a) the parameter input means is also for enabling the operator to input contact attempt history summarization parameters;
(b) the first processor means is also for producing summarized contact attempt history data from the contact attempt history data; and
(c) the historical data storage means is also for storing the contact attempt history summarization parameters and summarized contact attempt history data.

19. The computer system of claim 12 wherein the first processor means is also for:
(a) producing for each contact attempt period one of the sets of probability score values for each of a plurality of user-defined populations, the sets of probability score values being produced using a polytomous logistic regression method based upon the contact attempt history data and account history data; and
(b) producing the action result probability for each account and contact attempt period using the probability score values for the user-defined populations containing the respective account.

20. The computer system of claim 19 wherein the first processor means is also for rebuilding each set of probability score values at predetermined time intervals.

* * * * *

UNITED STATES PATENT AND TRADEMARK OFFICE
CERTIFICATE OF CORRECTION

PATENT NO. : 5,802,161
DATED : September 1, 1998
INVENTOR(S) : Alexander Svoronos and Daniel N. Duncan It is certified that error appears in the above-identified patent and that said Letters Patent is hereby corrected as shown below:

At Column 3, Line 2, delete "cost" and insert in its place --cost/--.

At Column 9, Line 54, delete "$X_{it}$" and insert in its place --$x_{it}$--.

At Column 15, Line 19 (last line of table), delete "time t/" and insert in its place --time t--.

At Column 17, Line 11 (last line of table), delete "time t/" and insert in its place --time t--.

Signed and Sealed this

Twelfth Day of January, 1999

Attest:

Attesting Officer

*Acting Commissioner of Patents and Trademarks*